(12) United States Patent
Du

(10) Patent No.: US 9,906,895 B1
(45) Date of Patent: Feb. 27, 2018

(54) SOUND SOURCE DEVICE

(71) Applicant: Kinpo Electronics, Inc., Taipei (TW)

(72) Inventor: Yung-Rung Du, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 15/430,554

(22) Filed: Feb. 13, 2017

(30) Foreign Application Priority Data

Jan. 5, 2017 (TW) .............................. 106200178 U

(51) Int. Cl.
| | |
|---|---|
| *H04B 1/00* | (2006.01) |
| *H04W 4/00* | (2018.01) |
| *H04M 1/725* | (2006.01) |
| *H04W 68/00* | (2009.01) |

(52) U.S. Cl.
CPC ......... *H04W 4/008* (2013.01); *H04M 1/7258* (2013.01); *H04W 68/005* (2013.01)

(58) Field of Classification Search
CPC .. H04R 2420/07; H04R 2430/01; H04R 3/12; H04R 2420/09; H04R 29/007; H04R 27/00; H04R 2227/003; H04W 4/008; G06F 3/165
USPC ...................................... 455/41.1, 41.2, 63.1
See application file for complete search history.

(56) References Cited

U.S. PATENT DOCUMENTS

| | | | |
|---|---|---|---|
| 2008/0233978 A1* | 9/2008 | Batey ....................... | H04M 1/05 455/41.2 |
| 2008/0270622 A1* | 10/2008 | Gupta ...................... | H04L 69/32 709/231 |
| 2009/0111530 A1* | 4/2009 | Nakayama ...... | H04M 1/274516 455/569.2 |
| 2015/0319556 A1* | 11/2015 | Chen ..................... | H04W 56/00 455/41.3 |
| 2016/0277791 A1* | 9/2016 | Fu ..................... | H04N 21/43637 |
| 2017/0094435 A1* | 3/2017 | Lin ........................ | H04R 27/00 |
| 2017/0102914 A1* | 4/2017 | Hong ..................... | G06F 3/165 |
| 2017/0149856 A1* | 5/2017 | Liu ........................ | H04W 4/008 |
| 2017/0180899 A1* | 6/2017 | Proctor, Jr. .......... | H04R 29/007 |

* cited by examiner

*Primary Examiner* — Nguyen Vo
*Assistant Examiner* — Max Mathew
(74) *Attorney, Agent, or Firm* — JCIPRNET

(57) ABSTRACT

A sound source device is provided. The sound source device includes a wireless communication module, a memory, an audio player, an audio processor and a microprocessor. The wireless communication module receives first digital audio data and generates second digital audio data and a first operation command, and the microprocessor generates a second operation command in response to the first operation command. The audio processor receives the second digital audio data, and converts the second digital audio data to analogy audio data; and the audio processor receives the second operation command, and converts the second digital audio data to an audio compressed file. The audio player receives and plays the analogy audio data, and the memory receives and stores the audio compressed file.

20 Claims, 2 Drawing Sheets

SOUND SOURCE DEVICE

CROSS-REFERENCE TO RELATED APPLICATION

This application claims the priority benefit of Taiwan application serial no. 106200178, filed on Jan. 5, 2017. The entirety of the above-mentioned patent application is hereby incorporated by reference herein and made a part of this specification.

BACKGROUND OF THE INVENTION

1. Field of the Invention

The disclosure relates to a sound source device and particularly relates to a sound source device capable of playing and recording sounds played by an external electronic device.

2. Description of Related Art

With increasingly intense competition in the audio market, wireless audio feature has become a key development item of large major corporations. Among various wireless technologies, Bluetooth is one of the most developed and widely-used technologies. For example, for portable electronic devices such as a tablet or a smartphone, Bluetooth wireless transmission technology is usually used for exchange and transmission of information with wireless peripheral equipment with Bluetooth chips.

Taking a Bluetooth speaker for example, an ordinary Bluetooth speaker may only play music in the portable electronic device or music provided by the third program in the portable electronic device after a Bluetooth connection with the portable electronic device through a wireless communication network. However, in an environment without the wireless communication network, the Bluetooth speaker may not deliver any effects. On the other hand, when the Bluetooth speaker is connected to the portable electronic device through the wireless communication network, and the Bluetooth speaker plays online broadcasting or music listened to by a user through the portable electronic device, the user may only listen to online broadcasting or music played by the Bluetooth speaker and is unable to store favourite contents in the Bluetooth speaker or the portable electronic device.

SUMMARY OF THE INVENTION

A sound source device is provided. While the sound source device is playing music from an electronic device, music that is played is recorded in a memory of the sound source device, and therefore, the function and application of the sound source device are heightened effectively.

The sound source device includes an audio processor, a wireless communication module, a memory, an audio player and a microprocessor. The wireless communication module receives first digital audio data and generates second digital audio data and a first operation command, and the microprocessor is coupled to the wireless communication module and generates a second operation command in response to the first operation command. An end of the audio processor is coupled to the wireless communication module to receive the second digital audio data and convert the second digital audio data to analogy audio data. The other end of the audio processor is coupled to the microprocessor, receives the second operation command and converts the second digital audio data to an audio compressed file. The audio player is coupled to the audio processor, receives and plays the analogy audio data. The memory is coupled to the audio processor to receive and store the audio compressed file.

In an embodiment of the disclosure, the first digital audio data are sounds played by the electronic device and received from the electronic device by the wireless communication module through the wireless communication network.

In an embodiment of the disclosure, the wireless communication network includes Bluetooth communication or near field communication, and the audio player includes a speaker.

In an embodiment of the disclosure, the first digital audio data are audio streamlining, and the wireless communication module receives the first digital audio data from the electronic device through a transport protocol. After the wireless communication module converts the first digital audio data to the second digital audio data, the wireless communication module transmits the second digital audio data to the audio processor further through an audio processing interface. The transport protocol includes an advanced audio distribution profile (A2DP), and the audio processing interface includes an integrated interchip sound (I2S) interface.

In an embodiment of the disclosure, the sound source device further includes at least one physical button, and the microprocessor instructs the audio processor to play at least one of a plurality of audio compressed files stored in the memory according to a first trigger signal generated by the at least one physical button.

In an embodiment of the disclosure, the first operation command is generated in response to a second trigger signal generated by the at least one physical button, and the microprocessor instructs the memory to store the audio compressed file according to the second trigger signal.

In an embodiment of the disclosure, the wireless communication module receives the operation command from the electronic device through the wireless communication network, the wireless communication module transmits the first operation command to the microprocessor through a first data transport interface, and the microprocessor gives the second operation command to the audio processor through a second data transport interface after receiving the first operation command.

In an embodiment of the disclosure, the first data transport interface and the second data transport interface include a universal asynchronous receiver/transmitter (UART) interface, respectively.

In an embodiment of the disclosure, when the wireless communication module is connected to the electronic device through the wireless communication network, and the wireless communication module receives an interrupt signal corresponding to a notification event, the audio processor stops playing the audio compressed file according to the interrupt signal. The notification event includes a call notification received from the electronic device, and the interrupt signal is triggered by picking up of a call corresponding to the call notification.

In an embodiment of the disclosure, the audio processor further plays a conversation of the call corresponding to the call notification through the audio player and stores the conversation in the format of the audio compressed file in the memory.

In view of the foregoing, the exemplary embodiment describes that the sound source device is given the operation command to play and record music and online broadcasting from the electronic device at the same time and solely play or record music and online broadcasting from the electronic device. Therefore, in an environment without the wireless communication network, the user may also play audio contents stored in the sound source device directly. Accordingly, the disclosure provides more versatile functions of the sound source device for the user, thereby elevating more convenient operating experience for the user.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
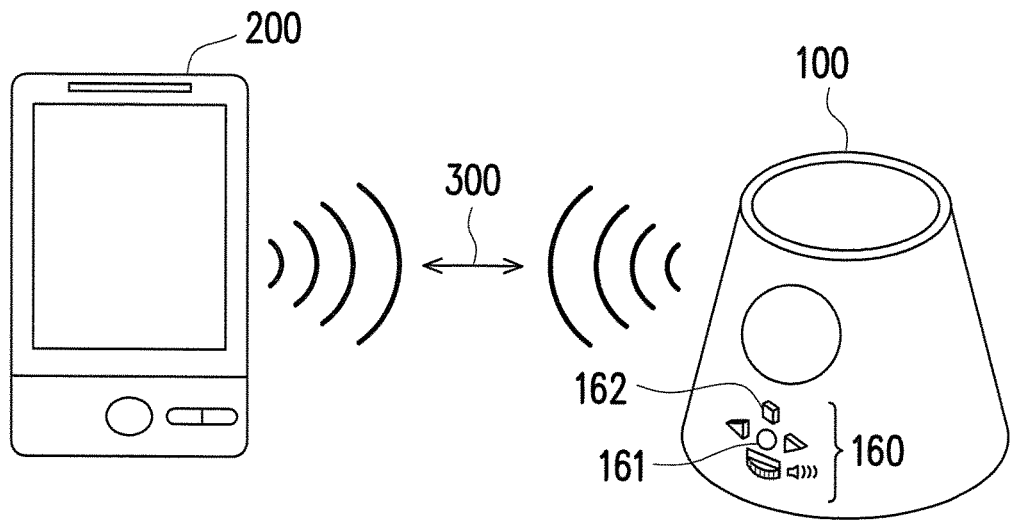
FIG. 1 is a schematic view illustrating an electronic device and a sound source device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

In order to heighten the operating function and application of a sound source device with wireless communication technology, the disclosure describes that the sound source device is given an operation command to record music in a memory of a Bluetooth speaker while playing music from an electronic device. In view of the above, in an environment without a wireless communication network, the Bluetooth speaker may also play music from the memory therein.

FIG. 1 is a schematic view illustrating an electronic device and a sound source device according to an embodiment of the disclosure.

Referring to FIG. 1, an electronic device 200 may be a mobile device, a personal digital assistant (PDA), a laptop, a tablet, an ordinary desktop computer or other electronic devices that may apply to communication and data transmission with a sound source device 100 through a wireless communication network 300. The sound source device 100 may be a device with Bluetooth wireless transmission technology, such as a Bluetooth speaker, a Bluetooth loudspeaker box, a Bluetooth player and the like. In an exemplary embodiment of the disclosure, a wireless communication network 300 includes Bluetooth communication and near field communication (NFC). For example, the electronic device 200 and the sound source 100 have communication functions that conform to the standards of near field communication, and the electronic device 200 and the sound source 100 engage in communication and transmission of relevant information through the near field communication to complete the operation of verification and matching therebetween. Next, the electronic device 100 plays music in the electronic device 200 or music provided by the third program in the electronic device 200 through Bluetooth communication. Particularly, in the exemplary embodiment of the disclosure, the sound source device 100 is further able to complete the recording of an audio file according to the command of a user while playing the audio file from the electronic device 200.

Figure 2:
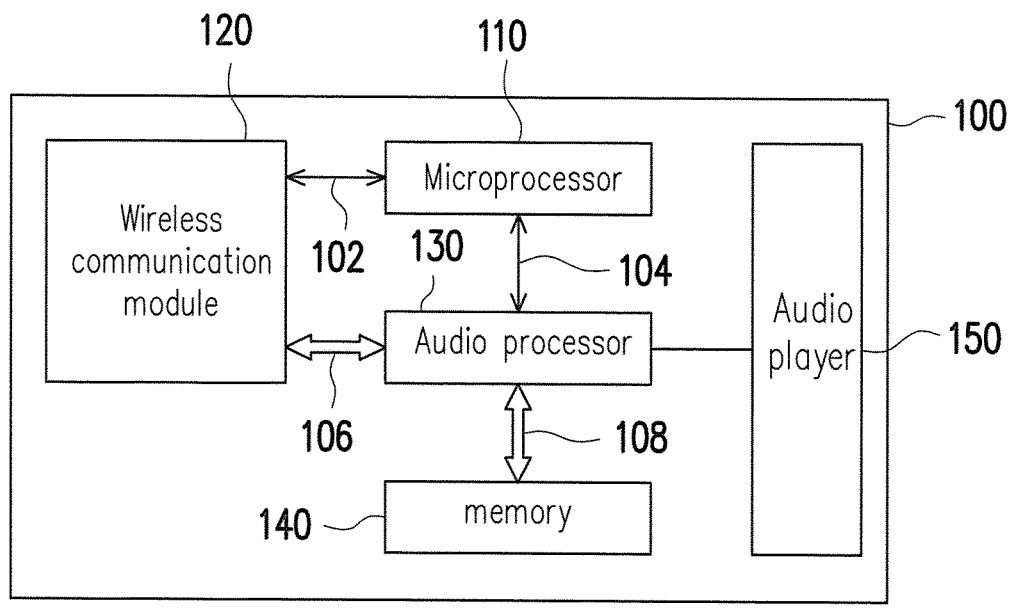
FIG. 2 is a block diagram illustrating a sound source device according to an embodiment of the disclosure.

FIG. 2 is a block diagram illustrating a sound source device according to an embodiment of the disclosure.

Referring to FIG. 2, the sound source device 100 includes a microprocessor 110, a wireless communication module 120, an audio processor 130, a memory 140 and an audio player 150.

The microprocessor 110 of the sound source device 100 is configured to control the overall operation of the sound source device 100. For example, the microprocessor 110 is a central processing unit (CPU) or a micro controller unit (MCU).

The wireless communication module 120 is coupled to the microprocessor 110 to communicate with other electronic devices outside the sound source device 100 through the wireless communication network 300. For example, the wireless communication network 300 of the sound source device 100 communicates with the electronic device 200 through a wireless communication network. In the exemplary embodiment, the wireless communication network 300 communicates with an external electronic device through the near field communication or the Bluetooth communication. Nonetheless, it is worth noting that the disclosure is not limited thereto and may apply to other wireless communication networks as well.

The audio processor 130 may be, for example, an audio processing chip. The audio processor 130 is coupled to the microprocessor 110 to process sounds on digital audio data, for example, by decoding, converting files and adjusting the volume and timbre of sounds that are input while receiving the digital audio data of sounds played by the electronic device 200.

The memory 140 is coupled to the audio processor 130 to store the digital audio data of the sounds played by the electronic device 200. Specifically speaking, in the exemplary embodiment of the disclosure, the memory 140 is a flash one and includes all kinds of embedded storage devices such as an embedded multimedia card (eMMC) and/or an embedded multi chip package (eMCP).

The audio player 150 is configured to play sounds from the electronic device 200 or sounds stored in the memory 140, and the audio player 150 includes a speaker, a loudspeaker box and an output port of sound sources.

Figure 3:
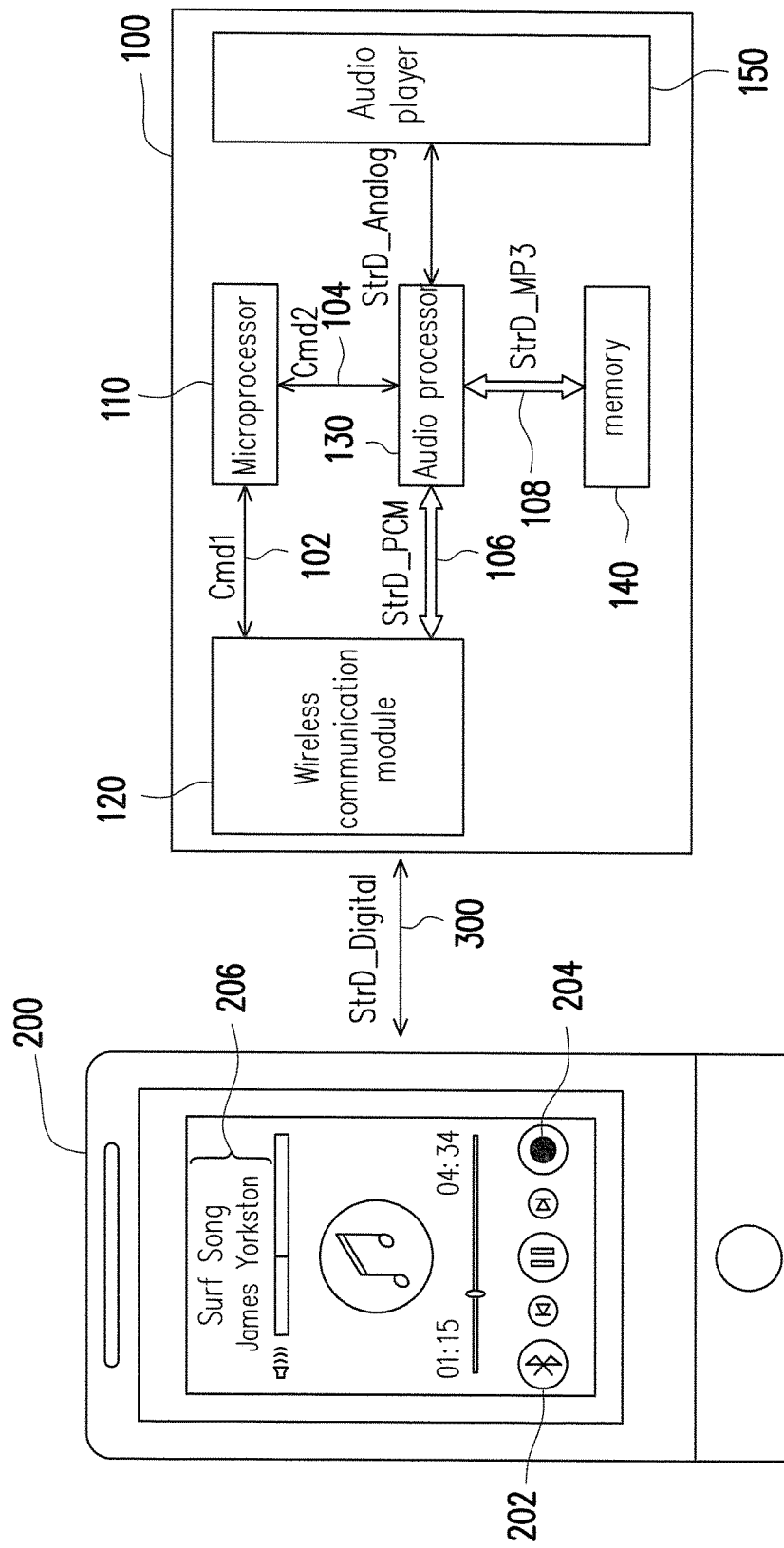
FIG. 3 is a schematic view illustrating a sound source device recording sounds played by an electronic device according to an embodiment of the disclosure.

To more clearly describe the operation between the sound source device 100 and the electronic device 200 of the disclosure, multiple examples are provided in FIGS. 1, 2 and 3.

FIG. 3 is a schematic view illustrating the sound source device recording sounds played by the electronic device according to an embodiment of the disclosure. Referring to FIGS. 1-3 in the meanwhile, if a user using the electronic device 200 would like to play music in the electronic device 200 through the sound source device 100, the user may give a command to the sound source device 100 through a music-playing application in the electronic device 200. For example, in addition to the functions of playing, pausing, fast-forwarding, rewinding music, as well as adjusting the volume, the music-playing program in the electronic device 200 further provides a functional option 202 for playing music and a functional option 204 for recording when the sound source device 100 is used. It is worth noting that the disclosure does not limit the timing when the user uses these functional options. For example, the user may activate these functions before the electronic device 200 does not play any music or during the process of playing music. In addition, the application as shown by the electronic device 200 in FIG. 3 is merely an exemplary one, but is not meant to limit the disclosure.

Specifically speaking, after the user activates the functional option 202 for playing music and the functional option 204 for recording when using the sound source device 100, the electronic device 200 transmits digital audio data StrD_Digital (also called first digital audio data StrD_Digital) that are currently played or expected to be played and music information 206 to the sound source device 100 through the wireless communication network 300 and a transport protocol. In other words, the wireless communication module 120 of the sound source device 100 receives the first digital audio data StrD_Digital from the electronic device 200 through the wireless communication network 300.

The first digital audio data StrD_Digital are audio streaming, and the music information 206 includes relevant information such as the name of a song, a singer and the like. In addition, the transport protocol may be, for example, an advanced audio distribution profile (A2DP). A Bluetooth audio encoding format, where Bluetooth audio transmission is carried out by using A2DP, primarily includes SBC (Sub-band Codec) and advanced audio coding (AAC). SBC is a standard audio encoding technology used in the sound source device, and AAC is more preferable than SBC in terms of compression technology. The compression technology reduces distortion of sounds and maintains more high-frequency details.

Specifically speaking, when the user activates the functional option 202 for playing music and the functional option 204 for recording in using the sound source device 100, the electronic device 200 transmits an operation command Cmd1 (also called the first operational command Cmd1) corresponding to the functional option 202 for playing music and the functional option 204 for recording to the wireless communication module 120 through the wireless communication network 300. The wireless communication module 120 transmits the first operation command Cmd1 to the microprocessor 110 through a data transmission interface 102 (also called the first data transmission interface 102). Moreover, after the microprocessor 110 receives the first operation command Cmd1, the microprocessor 110 gives an operation command Cmd2 (also called the second operational command Cmd2) to the audio processor 130 through a data transmission interface 104 (also called the second data transmission interface 104). Specifically speaking, after the microprocessor 110 receives the first operation command Cmd1, the microprocessor 110 gives the second operation command Cmd2 according to the first operation command Cmd1 to instruct the audio processor 130 to record and play sounds. In the exemplary embodiment, the microprocessor 110 receives the first operation command Cmd1 corresponding to the functional option 202 for playing music and the functional option 204 for recording. Consequently, the microprocessor 110 instructs the audio processor 130 to record and play sounds. Nonetheless, the disclosure is not limited thereto. For example, in another exemplary embodiment, recording is a default operation. Consequently, if the user merely activates the functional option 202 for playing music of the sound source device 100, the wireless communication module 120 also transmits the first operation command Cmd1 for instructing the audio processor 130 to record and play sounds to the microprocessor 110. The first data transmission interface 102 and the second data transmission interface 104 may be, for example, a universal asynchronous receiver/transmitter interface, respectively.

It is worth noting that the first operation command Cmd1 is generated in response to the user who solely presses the functional option 202 for playing music on the electronic device 200 and implements default recording. Nonetheless, the disclosure is not limited thereto. For example, in another exemplary embodiment, if the recording is not a default operation, the user may press the functional option 204 for recording during the process where music is played by the sound source device to enable the wireless communication module 120 to transmit the first operation command Cmd1 to the microprocessor 110. Next, the microprocessor 110 transmits the second operation command Cmd2 again to instruct the audio processor 130 to record.

Further to the above, after the wireless communication module 120 receives the first digital audio data StrD_Digital, the wireless communication module 120 transmits the first digital audio data StrD_Digital to the audio processor 130 through an audio processing interface 106. The audio processing interface 106 is an integrated interchip sound (I2S) interface 106. Particularly, a data format transmitted via the integrated interchip sound interface 106 is pulse code modulation (PCM). Accordingly, the wireless communication module 120 converts the digital audio data StrD_Digital to the digital audio data StrD_PCM (also called the second digital audio data StrD_PCM) in the PCM data format. The audio processor 130 may receive the second digital audio data StrD_PCM through the integrated interchip sound interface 106.

Afterward, the audio processor 130 converts the second digital data StrD_PCM to the audio compressed file StrD_MP3 according to an instruction of the microprocessor 110 and stores the audio compressed file StrD_MP3 in the memory 140 through a connection interface 108 to complete recording. The connection interface 108 may meet the secure digital interface standards, multi media card (MMC) interface standards or other proper standards. The audio compressed file StrD_MP3 belongs to a MP3 format of digital audio encoding and lossy compression. It is worth noting that in the exemplary embodiment, the audio processor 130 stores the audio compressed file StrD_MP3 in the built-in memory 140. Nonetheless, the disclosure is not limited thereto. For example, in another exemplary embodiment, the sound source device 100 allows external connection to a memory device, such as a SD card, USB or a solid state disk. The audio processor 130 stores the audio compressed file StrD_MP3 in the external memory device. Particularly, in the exemplary embodiment of the disclosure, the microprocessor 110 instructs the audio processor 130 to record and play sounds. Consequently, while the audio processor 130 records to store the audio compressed file StrD_MP3 in the memory 140, the audio processor 130 may play the audio compressed file StrD_MP3 through the audio player 150 to implement the recording. The audio processor 130 firstly decodes the audio compressed file StrD_MP3 to analogy audio data StrD_Analog and transmits the audio data StrD_Analog to the audio player 150 to play the analogy audio data StrD_Analog through the audio player 150.

In view of the above, in the exemplary embodiment of the disclosure, the sound source device 100 may play and record the sounds from the electronic device 200 at the same time. Accordingly, while the user plays music by using the sound source device 100, the favourite music of the user in the electronic device 200 may be recorded through the sound source device 100. Particularly, the technical solution makes it possible to store internet broadcasting or internet music that are intended for storage in the memory 140 of the sound source device 100 while the sound source device 100 plays internet broadcasting or internet music listened to by the user through the electronic device 200. Afterward, the user may directly play music stored in the sound source device 100, and it is no longer necessary to make a connection with the electronic device 200. In other words, if the wireless communication module 120 of the sound source device 100 is not connected to the electronic device 200 through the wireless communication network 300, the audio processor 130 plays the audio compressed file stored in the memory 140 through the audio player 150.

Specifically speaking, the sound source device 100 may further include the at least one physical button 160 (as illustrated in FIG. 1). When the user would like to play the audio compressed file stored in the memory 140 of the sound source device 100, the user may play and pause the audio compressed file in the sound source device 100, adjust the volume and select songs of the audio compressed file in the sound source device 100. For example, when the user chooses a play button 161 among the physical button 160, the microprocessor 110 makes a trigger signal (also called the first trigger signal) generated by the play button 161 serve as an operation command corresponding to playing and transmits the trigger signal to the audio processor 130. The audio processor 130 plays at least one of the audio compressed files stored in the memory 140 according to the first trigger signal. Besides, in the exemplary embodiment, the operation of activating the recording function of the sound source device 100 is described by taking the functional option 204 provided by the electronic device 200 chosen by the user for example. Nonetheless, the disclosure is not limited thereto. For example, in another exemplary embodiment, the user may choose a recording button 162 among the physical button 160 to activate the recording function of the sound source device 100. Specifically speaking, when the user chooses the recording button 162 among the physical button 160, the microprocessor 110 makes a trigger signal (also called the second trigger signal) generated by the recording button 162 serve as the first operation command corresponding to the operation of recording and transmits the trigger signal to the audio processor 130. The audio processor 130 converts the digital audio data to the audio compressed file according to the second trigger signal and stores the audio compressed file in the memory 140. It is worth noting that the embodiment of the at least one physical button 160 as illustrated in FIG. 1 is merely an exemplary embodiment, but is not intended to limit the disclosure.

In another exemplary embodiment, when the user plays and records music in the electronic device 200 through the sound source device 100, the electronic device 200 receives a notification event (such as a call notification), and then the user may choose whether to pick up the call corresponding to the call notification. If the user does not pick up the call corresponding to the call notification, the sound source device 100 continues playing music. Conversely, if the user picks up the call corresponding to the call notification, the electronic device 200 generates a interrupt signal in response to connection with the call notification. The wireless communication module 120 of the sound source device 100 receives the interrupt signal through the wireless communication network 300 to enable the audio processor 130 to stop playing the current audio compressed file according to the interrupt signal and enable to the sound source device 100 to continue playing music that is previously paused after the conversation is over. Particularly, the sound source device 100 may also serve as a speakerphone to play the conversation corresponding to the call corresponding to the call notification. For example, the audio processor 130 further plays the conversation of the call corresponding to the call notification through the audio player 150 and stores the conversation in the format of the audio compressed file in the memory 140.

In view of the foregoing, the disclosure describes that the sound source device is given the operation command to play and record music and internet broadcasting from the electronic device at the same time, solely play or record music and internet broadcasting from the electronic device. Therefore, in the case where the sound source device is not connected to the electronic device online, the sound source device plays the audio content stored therein directly. On the other hand, the disclosed sound source device may also serve as a speakerphone to play and record the conversation when the electronic device is used. In that case, it is possible to effectively resolve the problem of failure of the Bluetooth speaker to deliver any effect in an environment without the wireless communication network. The function and application of the sound source device may also be effectively elevated to provide the user with more versatile and convenient operating experience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sound source device, comprising:
a wireless communication module receiving a first digital audio data and generating a first operation command in response to the first audio data;
a microprocessor coupled to the wireless communication module and generating a second operation command in response to the first operation command;
an audio processor, wherein an end of the audio processor is coupled to the wireless communication module to receive the first digital audio data and convert the first digital audio data to analogy audio data, and, at the same time, the other end of the audio processor is coupled to the microprocessor to receive the second operation command and convert the first digital audio data to an audio compressed file;
an audio player coupled to the audio processor, receiving and playing the analogy audio data; and
a memory coupled to the audio processor, receiving and storing the audio compressed file.

2. The sound source device according to claim 1, wherein the first digital audio data are sounds played by an electronic device and received from the electronic device by the wireless communication module through a wireless communication network.

3. The sound source device according to claim 2, wherein the wireless communication network comprises Bluetooth communication or near field communication, and the audio player comprises a speaker.

4. The sound source device according to claim 1, wherein the first digital audio data is an audio streaming, and the wireless communication module receives the first digital audio data from the electronic device through a transport protocol, and the wireless communication module converts the first digital audio data to a second digital audio data, the wireless communication module further transmits the second digital audio data to the audio processor through an audio processing interface, wherein the transport protocol comprises an advanced audio distribution profile (A2DP), and the audio processing interface comprises an integrated interchip sound (I2S) interface.

5. The sound source device according to claim 1, further comprising at least one physical button, wherein the microprocessor instructs the audio processor to play at least one of a plurality of audio compressed files stored in the memory according to a first trigger signal generated by the at least one physical button.

6. The sound source device according to claim 5, wherein the first operation command is generated in response to a second trigger signal generated by the at least one physical button, and the microprocessor instructs the memory to store the audio compressed file according to the second trigger signal.

7. The sound source device according to claim 1, wherein the wireless communication module receives the operation command from the electronic device through the wireless communication network, and the wireless communication module transmits the first operation command to the microprocessor through a first data transport interface, wherein after the microprocessor receives the first operation command, the microprocessor gives the second operation command to the audio processor through a second data transport interface.

8. The sound source device according to claim 7, wherein the first data transport interface and the second data transport interface comprise a universal asynchronous receiver/transmitter (UART) interface, respectively.

9. The sound source device according to claim 2, wherein when the wireless communication module is connected to the electronic device through the wireless communication network, and the wireless communication module receives an interrupt signal corresponding to a notification event, the audio processor stops playing the audio compressed file according to the interrupt signal, wherein the notification event comprises a call notification received from the electronic device, and the interrupt signal is triggered by picking up a call corresponding to the call notification.

10. The sound source device according to claim 9, wherein the audio processor further plays a conversation of the call corresponding to the call notification through the audio player and stores the conversation in the format of the audio compressed file in the memory.

11. A sound source device, comprising:
a wireless communication module receiving a first digital audio data and generating a second digital audio data and a first operation command in response to the first audio data;
a microprocessor coupled to the wireless communication module and generating a second operation command in response to the first operation command;
an audio processor coupled to the wireless communication module and the microprocessor, the audio processor converting the second digital audio data to analogy audio data and converting the second digital audio data to an audio compressed file according to the second operation command at the same time;
an audio player coupled to the audio processor, receiving and playing the analogy audio data; and
a memory coupled to the audio processor, receiving and storing the audio compressed file.

12. The sound source device according to claim 11, wherein the first digital audio data are sounds played by an electronic device and received from the electronic device by the wireless communication module through a wireless communication network.

13. The sound source device according to claim 12, wherein the wireless communication network comprises Bluetooth communication or near field communication, and the audio player comprises a speaker.

14. The sound source device according to claim 11, wherein the first digital audio data are audio streaming, and the wireless communication module receives the first digital audio data from the electronic device through a transport protocol, wherein after the wireless communication module converts the first digital audio data to the second digital audio data, the wireless communication module further transmits the second digital audio data to the audio processor through an audio processing interface, wherein the transport protocol comprises an advanced audio distribution profile (A2DP), and the audio processing interface comprises an integrated interchip sound (I2S) interface.

15. The sound source device according to claim 11, further comprising at least one physical button, wherein the microprocessor instructs the audio processor to play at least one of a plurality of audio compressed files stored in the memory according to a first trigger signal generated by the at least one physical button.

16. The sound source device according to claim 15, wherein the first operation command is generated in response to a second trigger signal generated by the at least one physical button, and the microprocessor instructs the memory to store the audio compressed file according to the second trigger signal.

17. The sound source device according to claim 11, wherein the wireless communication module receives the operation command from the electronic device through the wireless communication network, and the wireless communication module transmits the first operation command to the microprocessor through a first data transport interface, wherein after the microprocessor receives the first operation command, the microprocessor gives the second operation command to the audio processor through a second data transport interface.

18. The sound source device according to claim 17, wherein the first data transport interface and the second data transport interface comprise a universal asynchronous receiver/transmitter (UART) interface, respectively.

19. The sound source device according to claim 12, wherein when the wireless communication module is connected to the electronic device through the wireless communication network, and the wireless communication module receives an interrupt signal corresponding to a notification event, the audio processor stops playing the audio compressed file according to the interrupt signal, wherein the notification event comprises a call notification received from the electronic device, and the interrupt signal is triggered by picking up a call corresponding to the call notification.

20. The sound source device according to claim 19, wherein the audio processor further plays a conversation of the call corresponding to the call notification through the audio player and stores the conversation in the format of the audio compressed file in the memory.

\* \* \* \* \*